April 6, 1948.       G. N. BOLINGER       2,439,125
ICE CREAM SCOOP
Filed May 19, 1944       2 Sheets-Sheet 2
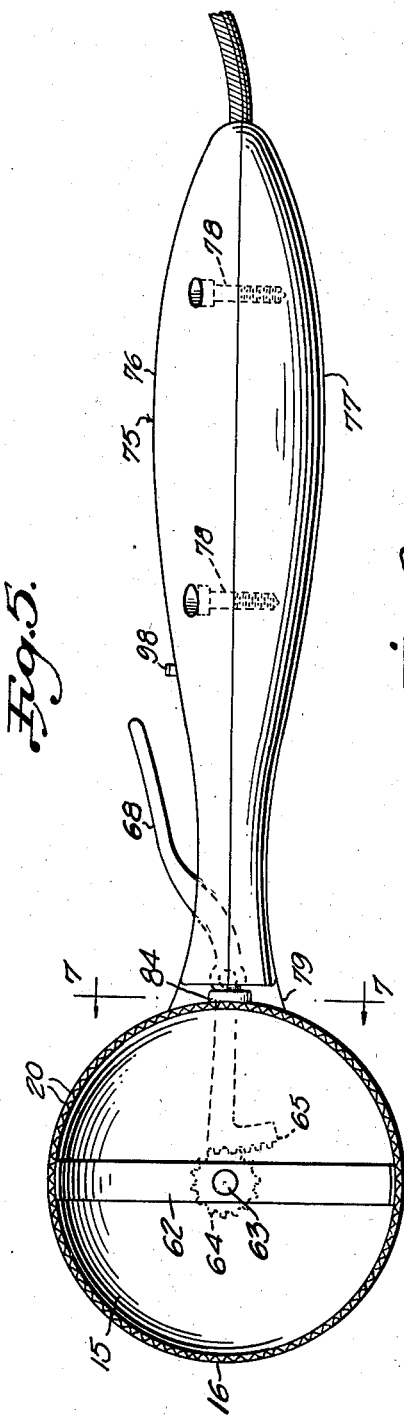
INVENTOR
GEORGE N. BOLINGER
By
ATTORNEY Patented Apr. 6, 1948

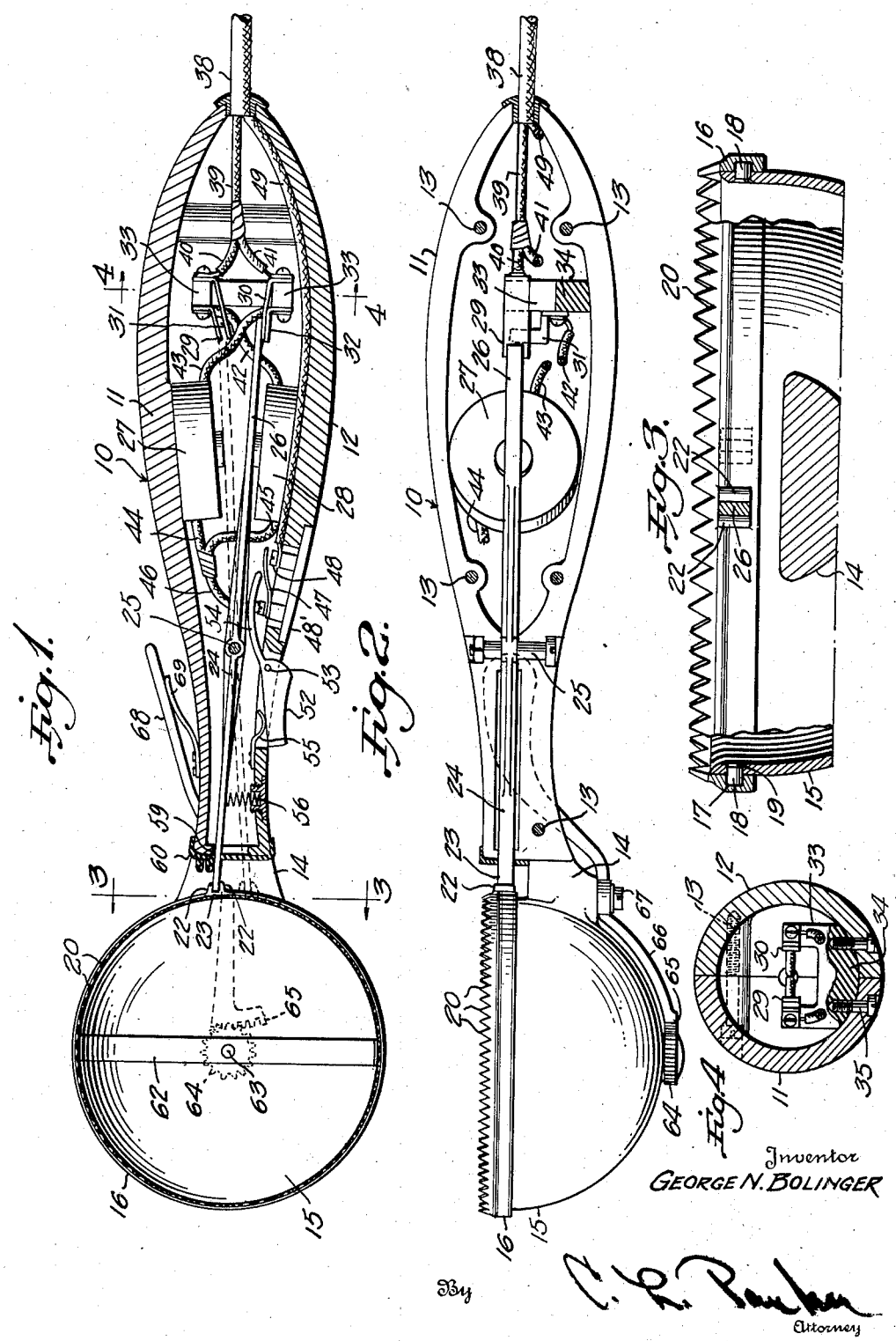

2,439,125

UNITED STATES PATENT OFFICE 2,439,125

ICE-CREAM SCOOP

George Noel Bolinger, Shelbyville, Ill.

Application May 19, 1944, Serial No. 536,357

12 Claims. (Cl. 107—48)

This invention relates to ice cream dippers.

As is well known conventional ice cream dippers comprise substantially hemispherical scooping cups connected to handles and are provided with means movable within the cup or scoop to discharge the dipped ice cream therefrom. The scoop is pressed into the ice cream solely by the exercise of physical force, and where the ice cream is frozen particularly hard, great physical effort is required in scooping the ice cream.

An important object of the present invention is to provide a scoop having means associated therewith for assisting in the insertion of the open side of the scoop into the body of the ice cream, regardless of how hard the ice cream is frozen, thus materially reducing the physical effort required in scooping the ice cream.

A further object is to provide a device of this character wherein the edge of the scoop or cup of the device is provided with power-operated means for penetrating into the body of the ice cream without the exercise of substantial physical force by the operator.

A further object is to provide such a device wherein the means for penetrating the ice cream is in the form of an annular member having saw teeth and provided with means for effecting a rapid oscillation of the penetrating means to cause it to cut or saw into the body of the cream.

A further object is to provide such a device wherein the cutting means is readily under the control of the operator's hand which holds and operates the device.

Other objects and advantages of the invention will become apparent during the course of the following description.

In the drawings I have shown two embodiments of the invention. In this showing—

Figure 1 is a longitudinal sectional view through the device taken centrally through the handle, parts being shown in elevation, Figure 2 is a similar view taken at right angles to Figure 1, Figure 3 is a section on line 3—3 of Figure 1, parts being broken away, Figure 4 is a transverse sectional view on line 4—4 of Figure 1, Figure 5 is an elevational view of a modified form of the invention, Figure 6 is a longitudinal sectional view through the same, taken centrally through the handle and looking in the same direction as Figure 5, parts being shown in elevation, Figure 7 is a sectional view taken on line 7—7 of Figure 5, parts being broken away, and Figure 8 is a transverse sectional view on line 8—8 of Figure 6.

Referring to Figures 1 to 4 inclusive, the numeral 10 designates the handle of the device as a whole preferably formed of complementary sections 11 and 12 divided longitudinally of the handle, the two handle sections being secured together in any suitable manner, for example by screws 13. One end of one of the handle elements is provided with an extension 14 which carries a conventionally shaped cup or scoop 15. This scoop may be integral with the element 14 or may be secured thereto in any suitable manner.

A cutting ring 16 surrounds the scoop 15 adjacent its opposite side as shown in Figure 3. This ring is supported in any suitable manner with respect to the scoop 15 to be oscillated about the axis of the ring 16. For this purpose, the ring 16 may be provided with an internal annular groove 17 engageable by a plurality of hardened pins 18 projecting through the scoop 15. In assembling the device, the ring 16 will be placed in position and the pins 18 driven through the openings 19 drilled in the scoop 15, the pins 18 preferably having their inner ends headed as shown and being braised or welded in the scoop 15. The ring 16 projects beyond the edge of the scoop 15 and is provided with a cutting edge preferably in the form of saw teeth 20.

At the side of the ring 16 facing the handle 10, a pair of spaced lips 22 is formed integral with the ring to receive the adjacent end 23 of an operating lever 24, this lever being pivoted on a pin 25 mounted in the handle 10 as shown in Figure 2 and serving as a bearing for the lever 24. The opposite end portion 26 of the lever 24 serves as an armature to be alternately attracted by magnets 27 and 28 carried by the respective handle sections 11 and 12, such alternate attraction of the armature serving to rapidly oscillate the lever 24.

The extremity of the lever end 26, as the lever oscillates, is alternately engageable with spring contacts 29 and 30 and these contacts are respectively movable into engagement with contacts 31 and 32. The four contacts referred to are carried by upstanding posts 33 preferably formed integral with an insulating block 34 secured to the respective handle sections 11 and 12 by screws 35.

A cable 38, connected to a suitable source of current, extends into the free end of the handle and has one wire 39 thereof divided into branches 40 and 41 connected to the respective contacts 29 and 30. The contacts 31 and 32 are connected to the respective magnets 28 and 27 by wires 42 and 43. The other ends of the windings of the magnets 27 and 28 are respectively connected to branches 44 and 45 of a wire 46 leading to a spring contact 47 carried by an insulated plate 48. The spring contact 47 constitutes a switch arm movable into engagement with a contact 48 forming a binding post for the second wire 49 from the source. A switch operating finger 52 is pivoted to the handle as at 53 and is provided with an operating arm 54 engageable with the spring contact 47 upon depression of the opposite end of the finger 52, this finger being normally held in inoperative position by a small spring 55.

It will become apparent that when the switch contact 47 is closed, the circuits to the magnets 27 and 28 will be alternately closed to oscillate the lever 24. To insure initial closing of one of these circuits, a spring 56 engages one end of the lever 24 to urge the end 26 thereof to a position engaging the contacts 30 and 32, as shown in Figure 1.

The end of the handle 10 adjacent the scoop 15 obviously is provided with a transversely elongated opening 59 through which the lever end 23 projects, the opening being long enough to permit the necessary oscillatory movement of the lever 24. If desired, the opening 59 may be maintained closed by a thin highly flexible waterproof boot 60 to prevent the entrance of ice cream or any other foreign material into the open handle.

The device is preferably provided with means, which may be conventional, for cutting the ice cream loose from the scoop to permit its discharge therefrom. For this purpose, the device has been shown as having a conventional semicircular slicing member 62 arranged in the scoop and connected to a short shaft 63 projecting through the bottom of the scoop and carrying a pinion 64. This pinion is engageable by a segment gear 65 carried by one end of a lever 66 pivoted as at 67 to the extension 14. The other end of the lever 66 (Figure 1) terminates in a finger piece 68 normally urged outwardly from the handle 10 by a suitable spring 69.

In the form of the device just described the power means for operating the ring 16 is contained within the handle of the device. In the form of the invention shown in Figures 5 to 8 inclusive, an external power source may be employed and the power may be transmitted to the ring 16 to oscillate it by means of a flexible shaft and other drive means to be described. The scoop and the elements associated therewith are identical with the corresponding elements described above, except as noted below, and the same reference numerals have been applied to the corresponding parts.

The handle of the modified form of the device is indicated as a whole by the numeral 75 and is formed of longitudinally divided complementary sections 76 and 77 secured together by screws 78. One of the handle sections carries a projection 79, similar to the projection 14 previously described, and by which the scoop 15 is carried. Within the handle is arranged a shaft 80 journalled in bearings 81 and 82 and one end of this shaft carries a cam 83 engageable against opposite flanges 84 formed integral with the ring 16. The shaft 80 may be squared, as shown in Figure 7, at the end thereof to which the cam 83 is connected, and the cam may be suitably secured as by welding to the shaft 80.

In alinement with the shaft 80 is a second shaft 86 journalled in a suitable bearing 87 and the shaft 86 is connected to a conventional flexible shaft indicated as a whole by the numeral 88 and having the usual flexible sleeve projecting from the free end of the handle 75, the flexible shaft being driven by an electric motor, a compressed air motor or any other suitable source of power. The shafts 80 and 86 are respectively provided with clutch elements 90 and 91 the latter of which is splined on the shaft 86 as at 92 and is provided with a groove 93. The shaft 80 may be provided with a pilot 94 entering the adjacent end of the shaft 86 to maintain the two shafts in fixed axial alinement.

Obviously, the clutch element 91 is slidable on the shaft 86 but is fixed against rotation with respect thereto. This clutch element is moved into engagement with the clutch element 90 to drive the shaft 80 by means of a fork 95 the arms of which are arranged in the groove 93. The fork 95 is rigidly connected to a slide 96 arranged in a recess 97 formed in the handle 75, and the slide 96 is preferably provided with a finger piece 98 to facilitate its operation. The fork 95 is urged to a clutch-disengaging position by a suitable spring 99.

The operation of the form of the invention shown in Figures 1 to 4 inclusive is as follows:

The spring 56 urges the lever 24 to the solid line position shown in Figure 1, the spring contact 31 being engaged against the contact 32. When the operator is ready to use the device, the open side of the scoop is turned downwardly over the ice cream in the freezer, in the usual manner, whereupon the operator will depress the switch finger 52. The arm 54 will engage the spring contact 47 and move it into engagement with the contact 48. A circuit thus will be closed through wires 39 and 41, contacts 30 and 32, wire 43, magnet 27, wires 44 and 46 and contacts 47 and 48, and thence back to the source through wire 49. Thus the magnet 27 will be energized to attract the armature end 26 of the lever 24 to swing this lever in a counterclockwise direction as viewed in Figure 1. Such movement almost immediately releases the contact 30 from the contact 32, thus breaking the circuit to the magnet 27. The momentum of the lever will carry it into engagement with the end of the core of the magnet 27, prior to which the lever end 26 will have moved the spring contact 29 into engagement with the contact 31. A circuit will then be established from wires 39 and 40 through contacts 29 and 31 to the magnet 28, and thence through wire 45 and back to the source through the elements previously described. Energization of the magnet 28 reverses the movement of the lever 24, the lever then turning in a clockwise direction as viewed in Figure 4. This operation is repeated to continue the rapid oscillation of the lever 24 and the lever end 23, engaged between the lips 22, will effect oscillation of the ring 16 on its axis. The oscillatory movement obviously will be very rapid and the teeth 20 of the ring 16 will readily cut through ice cream which has been frozen extremely hard, the operator exerting only enough force to feed the scoop into the ice cream as the cutting action progresses. The force required will be very slight, being only a fraction of that necessary for cutting into a stiffly frozen body of ice cream with a conventional scoop.

The action referred to will be continued until a sufficient quantity of ice cream has been scooped up, whereupon the operator will release the finger 52 to stop the operation of the power means. The scoop will then be placed in a proper position over a cone or dish, whereupon the operator will press inwardly on the finger piece 68 to rotate the element 62 and thus dislodge the ice cream within the scoop, in the usual manner.

The releasing of the ice cream from the scoop will release the ring 16 so that the spring 56 can function to return the lever 24 to its normal position shown in Figure 1. Thus the parts of the apparatus are always positioned so that one of the magnets will be energized upon operation of the finger 52. The switch fingers 29 are preferably relatively thin and highly resilient and offer little resistance to operation of the lever 24, and they may be readily bent to their proper adjusted positions. The handle 10 being formed of complementary sections the assembly of the device is greatly facilitated. One of the magnets is secured to each handle section and the various wire connections may be made before bringing the handle sections together. In assembling the device, one of the screws 35 (Figure 4) will be applied and tightened to secure the insulating block 34 in proper position, and the other screw 35 may be applied after the handle sections have been secured together.

In the form of the invention shown in Figure 5 the device is operated in exactly the same manner as in the form of the device described except that the slide 96 is operated to oscillate the ring 16 instead of operating the finger 52. The clutch elements 90 and 91 are normally disengaged and held disengaged by the spring 99. To operate the device, assuming that the source of power is operating to drive the shaft 86, the operator will merely engage the teeth 20 with the surface of the ice cream, push the finger piece 98 forwardly toward the scoop 15 to engage the clutch elements 90 and 91, and then feed the scoop downwardly into the ice cream. The shaft 80 will be driven with the shaft 86 to rotate the cam 83 and thus oscillate the ring 16 very rapidly so that the teeth 20 cut readily into the body of the ice cream. When the scooping action has been completed, the operator will release the finger piece 96, whereupon the spring 99 will disengage the clutch and oscillation of the ring 16 will stop. The handle 68 then may be operated to discharge the ice cream from the scoop.

It will be apparent that the present device substantially minimizes the physical force necessary for the scooping of ice cream, a conventional scoop requiring the expenditure of great force when dipping ice cream which has been frozen very hard. The power driven means of the present device effectively cuts through the body of the ice cream, it merely being necessary for the operator to feed the scoop into the body of the cream with the same motion as is practiced with a conventional scoop.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A material scooping device comprising a handle, a stationary scoop carried by one end of said handle and having an open top of circular form, a cutting device extending at least partially around the open top of said scoop concentric therewith and supported solely by the edge portion of such open top for oscillating movement about its axis, and power means for oscillating said cutting device.

2. A material scooping device comprising a handle, a stationary scoop carried by one end of said handle and having an open top of circular form, a cutting device extending at least partially around the open top of said scoop concentric therewith and supported solely by the edge portion of such open top for oscillating movement about its axis, power means for oscillating said cutting device, and means carried by said handle for controlling said last named means.

3. A material scooping device comprising a handle, a stationary scoop carried by one end of said handle and having an open top of circular form, a cutting device extending at least partially around the open top of said scoop concentric therewith and supported solely by the edge portion of such open top for oscillating movement about its axis, and power driven means carried by said handle and projecting from said end thereof to engage said cutting device and operable to effect oscillating movement of said cutting device.

4. A material scooping device comprising a handle, a stationary scoop carried by one end of said handle and having an open top of circular form, a cutting device extending at least partially around the open top of said scoop concentric therewith and supported solely by the edge portion of such open top for oscillating movement about its axis, power driven means carried by said handle and projecting from said end thereof to engage said cutting device and operable to effect oscillating movement of said cutting device, and means carried by said handle and including a movable finger piece engageable by a finger of the operator for controlling said power driven means.

5. A material scooping device comprising a handle, a scoop carried by one end of said handle and having an open top of circular form, a cutting device extending at least partially around the open top of said scoop concentric therewith, means for supporting said cutting device for oscillating movement about its axis, a rocking lever arranged in said handle and having one end projecting therefrom and operatively engaging said cutting device whereby rocking of said lever will oscillate said cutting device, and means within said handle for rocking said lever.

6. A material scooping device comprising a handle, a scoop carried by one end of said handle and having an open top of circular form, a cutting device extending at least partially around the open top of said scoop concentric therewith, means for supporting said cutting device for oscillating movement about its axis, a rocking lever arranged in said handle and having one end projecting therefrom and operatively engaging said cutting device whereby rocking of said lever will oscillate said cutting device, electro-magnetic means within said handle for rocking said lever, and a switch device for said electro-magnetic means comprising a finger piece under the control of a finger of the operator's hand while holding said handle.

7. A material scooping device comprising a handle, a scoop carried by one end of said handle and having an open top of circular form, a cutting device extending at least partially around the open top of said scoop concentric therewith and having a recess, means for supporting said cutting device for oscillating movement about its axis, a shaft journalled in said handle, and an eccentric cam carried by said shaft and operatively engaging said recess whereby said cutting device will be oscillated upon rotation of said shaft.

8. A scooping device comprising a handle, a scoop rigidly connected to said handle, said scoop being substantially hemispherical with an open circular top, an annular cutting device surrounding the open top of said scoop, means for connecting said cutting device solely to the edge portion of the open top of said scoop for oscillation on the axis of said cutting device, said cutting device having a toothed edge adapted to cut into the material to be scooped upon oscillation of said cutting device, and power driven means carried by said handle and projecting therefrom and engaging said cutting device to oscillate it.

9. A scooping device comprising a handle, a scoop rigidly connected to said handle, said scoop being substantially hemispherical with an open circular top, an annular cutting device surrounding the open top of said scoop, means for connecting said cutting device to said scoop for oscillation on the axis of said cutting device, said cutting device having a toothed edge adapted to cut into the material to be scooped upon oscillation of said cutting device, a lever in said handle pivoted intermediate its ends to rock on an axis parallel to said first named axis, one end of said lever projecting from said handle and engaging said cutting device to oscillate it upon rocking movement of said lever, electromagnetic means housed in said handle adjacent the other end of said lever, said other end of said lever constituting an armature for said electro-magnetic means, and means for controlling energization of said electro-magnetic means to effect continuous rocking movement of said lever.

10. A device constructed in accordance with claim 9 provided with a switch device for controlling said electro-magnetic means, said switch device having a finger piece carried at such a position with respect to said handle as to be engageable by a finger of the operator's hand to render said electro-magnetic means operative or inoperative.

11. A material scooping device comprising a handle, a scoop carried thereby and having an open top of circular form, a cutting device extending at least partially around the open top of said scoop concentric therewith and supported solely by the edge portion of such open top for oscillation on its axis, said cutting device having a notch therein, and means engageable in said notch to effect oscillating movement of said cutting device.

12. A material scooping device comprising a handle, a scoop carried thereby and having an open top of circular form, a cutting ring surrounding the open top of said scoop and having a plurality of closely arranged cutting teeth projecting beyond such open top for engagement with the material to be scooped, said ring having a radially outwardly facing recess, and a power-driven element engageable in said recess to effect oscillating movement of said ring.

GEORGE NOEL BOLINGER.

REFERENCES CITED

The following references are of record in the file of this patent:

UNITED STATES PATENTS

| Number | Name | Date |
|---|---|---|
| 671,788 | Bach | Apr. 9, 1901 |
| 977,382 | Geier | Nov. 29, 1910 |
| 1,574,788 | Brueseke | Mar. 2, 1926 |
| 1,763,389 | Chapman | June 10, 1930 |
| 1,773,013 | Schupfer et al. | Aug. 12, 1930 |
| 2,109,598 | Stasmski et al. | Mar. 1, 1938 |
| 2,201,403 | Knaust | May 21, 1940 |
| 2,207,545 | Kolas | July 9, 1940 |